United States Patent [19]

Emura et al.

[11] Patent Number: 4,527,676

[45] Date of Patent: Jul. 9, 1985

[54] VARIABLE-DAMPING-FORCE SHOCK ABSORBER

[75] Inventors: Junichi Emura, Ebina; Issei Kanari, Tokyo; Hideaki Saito, Atsugi, all of Japan

[73] Assignee: Atsugi Motor Parts Co., Ltd., Japan

[21] Appl. No.: 462,202

[22] Filed: Jan. 31, 1983

[30] Foreign Application Priority Data

Feb. 13, 1982 [JP] Japan ............................ 57-21848[U]
May 31, 1982 [JP] Japan ............................ 57-80332[U]
May 31, 1982 [JP] Japan ............................ 57-80333[U]

[51] Int. Cl.³ .............................................. F16F 9/46
[52] U.S. Cl. ..................................... 188/299; 188/319
[58] Field of Search ............... 188/319, 279, 282, 284, 188/289, 299; 192/8 R; 464/162

[56] References Cited

U.S. PATENT DOCUMENTS

| 2,866,345 | 12/1958 | Woods | 192/8 R X |
| 3,805,552 | 4/1974 | Heald | 464/162 |
| 3,827,538 | 8/1974 | Morgan | 188/319 |

FOREIGN PATENT DOCUMENTS

| 2911768 | 2/1980 | Fed. Rep. of Germany | 188/319 |
| 55-65741 | 5/1980 | Japan . | |
| 173629 | 10/1982 | Japan | 188/279 |
| 173630 | 10/1982 | Japan | 188/279 |
| 57-202034 | 12/1982 | Japan . | |
| 490526 | 8/1938 | United Kingdom . | |
| 664770 | 1/1952 | United Kingdom . | |
| 942328 | 11/1963 | United Kingdom . | |
| 1006265 | 9/1965 | United Kingdom . | |
| 2036246 | 6/1980 | United Kingdom . | |

Primary Examiner—Bruce H. Stoner, Jr.
Assistant Examiner—M. P. Gilday
Attorney, Agent, or Firm—Lowe, King, Price & Becker

[57] ABSTRACT

A variable-damping-force shock absorber in which the motor for rotating the orifice adjuster is housed within the cylinder and the orifice-adjuster position sensor for outputting binary coded sensor signals is incorporated. Therefore, it is possible to reduce noise generated from the motor while improving the lifetime of the motor because mud or rain water will not adhere onto the motor and to improve the precision and the response speed in rotating the orifice adjuster because the adjuster can be feedback controlled in digital fashion. Further, since the driven shaft of the motor or the reduction gear is loosely coupled with the orifice adjuster in the axial direction thereof, it is possible to reduce the torque or the size of the motor, because fluid pressure is not directly applied to the driven shaft via the orifice adjuster.

11 Claims, 9 Drawing Figures

| MAN | ORIFICE | c | b | E | RANGE |
|-----|---------|---|---|------|-------|
| H | 12a | 1 | 1 | $E_1$ | A |
| M | 12b | 1 | 0 | $E_2$ | B |
| L | 12c | 0 | 1 | $E_3$ | C |
| MIN | 12d | 0 | 0 | $E_4$ | D |

1 : OPEN
0 : CLOSED

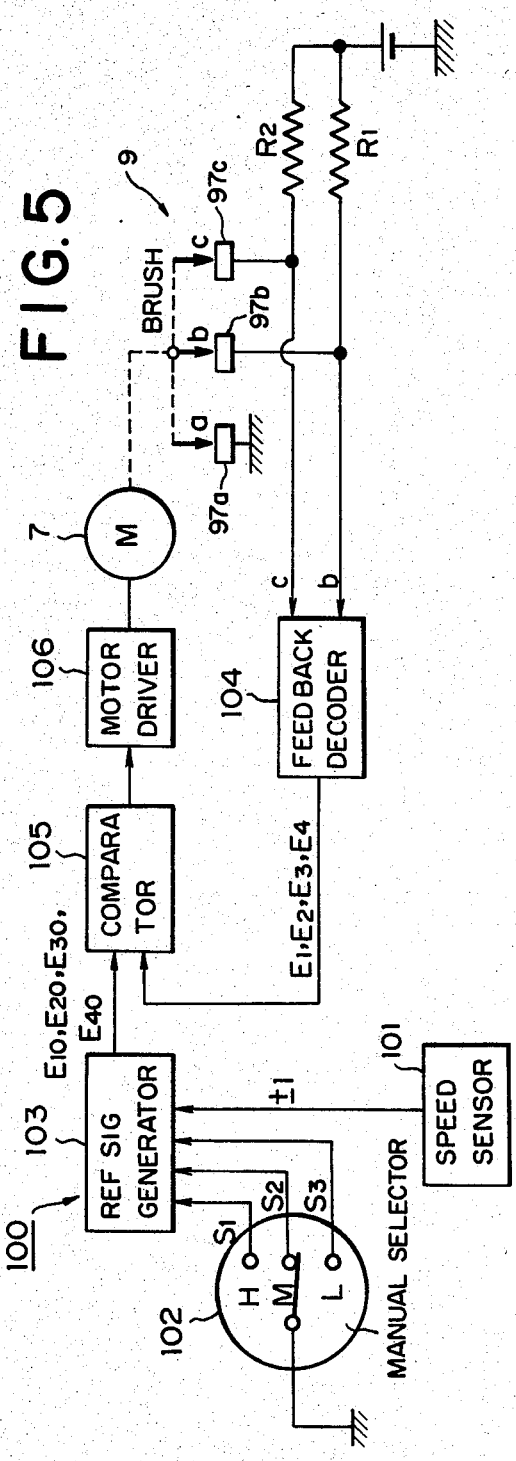

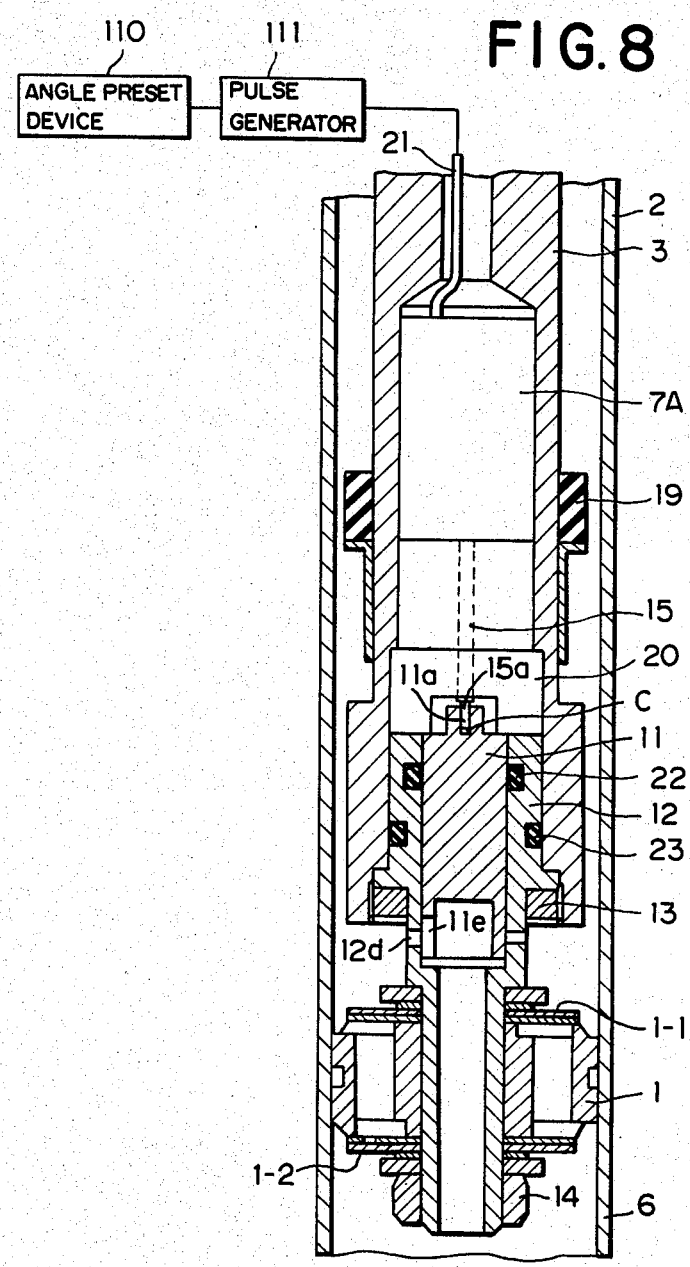

VARIABLE-DAMPING-FORCE SHOCK ABSORBER

BACKGROUND OF THE INVENTION

1. Field of the Invention

The present invention relates generally to a shock absorber used for suspension systems of an automotive vehicle for absorbing vibration energy and more specifically to a shock absorber in which damping force can be adjusted automatically according to vehicle speed or manually according to the driver's preference.

2. Description of the Prior Art

When an automotive vehicle rattles over a rough road, the springs in the suspension systems for the vehicle compress and extend to absorb the vibration shock. However, since the springs continue to vibrate until they return to their original states, the spring vibration reduces the road-holding ability and riding comfort of the vehicle. A shock absorber is used for imposing a restraint on the spring vibration for insuring better road holding capability and better riding comfort. To obtain better riding comfort, a shock absorber generally provides greater damping action when extended than when compressed. This action is achieved by the use of valves which change the flow of fluid filled within the shock absorber. This shock absorber, which provides damping action during both extension and compression, is in common use on today's vehicles. Further, the faster the working speed of the piston of a shock absorber, the greater the damping force or damping action of the shock absorber. If the damping force is too great, too hard a ride is obtained; if too soft, too soft a ride is obtained.

In the conventional shock absorber, however, since the damping forces during both extension and compression are usually fixed when working speed of the piston of the shock absorber is uniform, the road-holding ability, the riding comfort, or the steering-wheel manipulability vary according to vehicle speed or road harshness.

To overcome the above-mentioned problems, there has been proposed a variable-damping-force hydraulic shock absorber provided with a motor, an adjuster, etc. in which part of working fluid within the upper and lower chambers is by-passed during operation through one of a plurality of orifices of various diameters selected by an orifice adjuster rotated with a motor. That is to say, since part of the amount of the working fluid through the upper and lower piston valves is diminished, a smaller damping force can be obtained than the conventional damping-force obtained by the working fluid through only the valves. In this case, the adjuster is controlled in response to a feedback signal detected by an angular position sensor attached thereto.

In such a prior-art variable-damping-force hydraulic shock absorber as described above, since the adjusting motor and the related reduction gear are mounted outside the shock absorber, there exist problems in that the adjuster rotating motor is subjected to damage due to rain water or mud adhering thereto during vehicle running, resulting in deterioration of motor durability (short lifetime) and, what is worse, a noisy sound is often produced while the damping force is being adjusted.

Further, in such a prior-art variable-damping-force hydraulic shock absorber as described above, a potentiometer is widely used as the angular position sensor in order to detect the position of the adjuster rotated by the motor. However, since the potentiometer is usually so constructed that a brush or a sliding contact slides on a resistance material formed on an insulating board in order to increase or decrease resistance, the adjuster is usually feedback-controlled in analog fashion, thus resulting in another problem in that it is relatively difficult to control the angular position of the adjuster accurately and quickly in response to feedback signals generated by the potentiometer.

Furthermore, in such a prior-art variable-damping-force hydraulic shock absorber as described above, since the construction thereof is such that fluid pressure within the fluid chamber is directly applied to the driven shaft of the motor or the reduction gear via the adjuster in the axial direction thereof, the driven shaft is subjected to an axial pressure, thus resulting in another problem in that a greater torque is required for the motor and therefore the size of the motor is large or the driven shaft is easily damaged when fluid pressure rises abnormally.

SUMMARY OF THE INVENTION

With these problems in mind, therefore, it is the primary object of the present invention to provide a variable-damping-force shock absorber for an automotive vehicle which can reduce noise produced by the motor and protect the motor from mud or rain water for improvement in lifetime of the motor.

To achieve the above-mentioned object, in the variable-damping-force shock absorber for an automotive vehicle according to the present invention, the construction thereof is so improved that the motor is housed within the cylinder or the piston rod of the shock absorber.

Further, it is another object of the present invention to provide a variable-damping-force shock absorber for an automotive vehicle in which the adjuster is feedback controlled in digital fashion for more accurately and quickly rotating the adjuster.

To achieve the above-mentioned object, in the variable-damping-force shock absorber for an automotive vehicle according to the present invention, there is provided an adjuster position sensor including a plurality of brushes and a plurality of pattern leads for generating binary coded position signals.

Furthermore, it is a further object of the present invention to provide a variable-damping-force shock absorber for an automotive vehicle in which fluid pressure within the fluid chamber is not directly applied to the driven shaft of a reduction gear or a motor, in order to reduce the torque or size of the motor and additionally to extend the lifetime of the motor.

To achieve the above-mentioned object, in the variable-damping-force shock absorber for an automotive vehicle according to the present invention, there is provided a clearance between the driven shaft of the reduction gear or the motor and the adjuster in the axial direction thereof, while receiving the thrust force with an appropriate washers with a low friction coefficient disposed in contact with the adjuster.

BRIEF DESCRIPTION OF THE DRAWINGS

The features and advantages of the variable-damping-force shock absorber for an automotive vehicle according to the present invention over the prior-art shock absorber will be more clearly appreciated from the following description of the preferred embodiments of the invention taken in conjunction with the accompanying drawings in which like reference numerals designate the same or similar elements and in which:

FIG. 5 is a schematic block diagram of a control unit used with the first embodiment of the variable-damping-force shock absorber according to the present invention, whereby the revolution angle of the orifice adjuster is feedback-controlled in digital fashion;

FIG. 8 is a cross-sectional view of the essential portion of a third embodiment of the variable-damping-force shock absorber according to the present invention, including a schematic block diagram of the control unit used therewith, in which a step motor is incorporated therewithin.

DETAILED DESCRIPTION OF THE PREFERRED EMBODIMENTS

Figure 1:
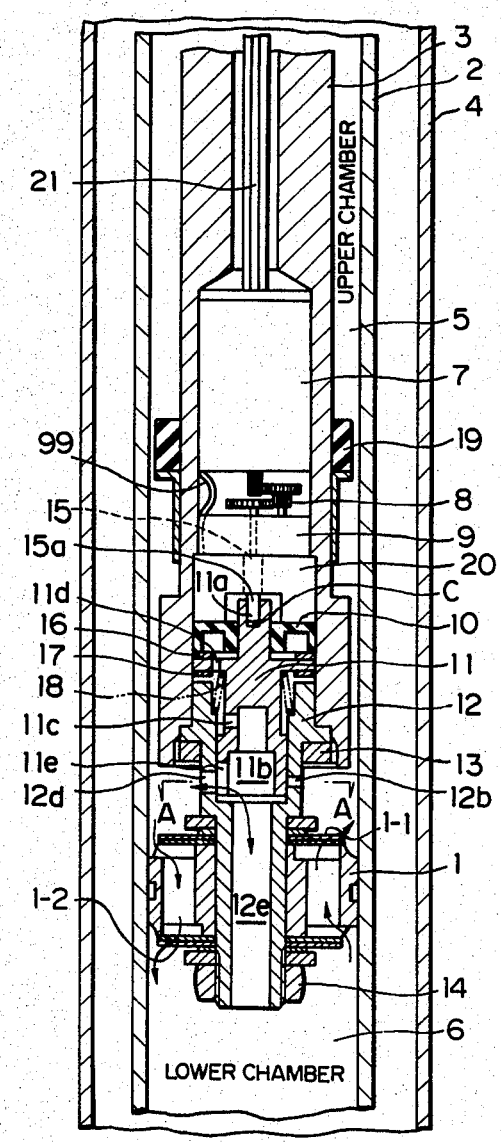
FIG. 1 is a cross-sectional view, partly side view, of the essential portion of a first embodiment of the variable-damping-force shock absorber according to the present invention.

In view of the above description, reference is now made to a first embodiment of the variable-damping-force shock absorber according to the present invention.

The construction of the shock absorber will be described hereinbelow with reference to FIG. 1.

The shock absorber basically comprises a piston assembly 1 provided with two piston valves 1-1 and 1-2 and fitted into a cylinder 2 filled with a fluid. A piston rod 3 is attached to the piston assembly 1 and is sealably and reciprocably inserted into the cylinder 2 through a packing (not shown) provided on top of the cylinder 2 to prevent fluid leakage. On top of the piston rod 3, there is provided a mounting eye (not shown) for installation to a car body (sprung portion). The reference numeral 4 denotes an outer tube to provide the reservoir chamber of working fluid within inner side thereof. The upper and lower chambers 5 and 6 inside the cylinder 2 are filled with working fluid and are connected to each other by means of the two piston valves 1-1 and 1-2. The lowermost part of the lower chamber 6 is connected to a reservoir provided between the outer periphery of the cylinder 2 and the inner periphery of the outer tube 4. The cylinder 2 has a mounting eye (not shown) at its lower end for connection to an axle (unsprung portion).

When the piston assembly 1 moves downward and therefore the shock absorber operates in compression mode, working fluid in the lower chamber 6 flows into the upper chamber through the upper piston valve 1-1 to effect a desirable damping force. When the piston assembly 1 moves upward, and therefore the shock absorber operates in extension mode, working fluid in the upper chamber 5 flows into the lower chamber through the lower piston valve 1-2 to effect a damping force. However, the fluid cannot readily flow through the lower piston valve 1-2 because the valve 2 is designed to provide resistance. Thus, the flow resistance which is produced as a damping force is greater during extension, than during compression.

In addition to the basic elements described above, the variable-damping-force shock absorber according to the present invention roughly comprises a motor 7 housed within a bored cavity of the piston rod 3, a reduction gear 8 made up of a train of gear wheels for reduction of revolution speed of the motor 7, an orifice adjuster position sensor 9 described later in greater detail, a shaft bearing 20, a sealing member 10, an orifice adjuster 11 rotatably connected to a driven shaft of the reduction gear 8 and provided with a cutout, and a tubular member 12 provided with a plurality of orifices of different diameters to which the piston assembly 1 is fixed.

To assemble central portion of the shock absorber, these elements are fitted to the central hollow cavity of the piston rod 3 in the order of the motor 7, the reduction gear 8, the orifice adjuster position sensor 9, the shaft bearing 20, the sealing member 10, the orifice adjuster 11, and the tubular member 12, and then these elements are fixed together to the piston rod 3 by screwing a flat screw 13 into the thread formed on the inner circumferential portion of the piston rod 3. Further, the piston assembly 1 is fixed to the tubular member 12 by a nut 14.

Additionally, in FIG. 1, the reference number 15 denotes a driven shaft of the reduction gear 8, the end of which is formed into a roughly square shape 15a by, for instance, a milling machine and is engaged with a slot 11a formed on top of the orifice adjuster 11 with a clearance C provided therebetween in the axial direction thereof, in order to prevent the upward pressure of the orifice adjuster 11 from being directly applied to the driven shaft 15. Therefore, when the driven shaft rotates, torque is freely transmitted from the reduction gear 8 to the orifice adjuster 11 through the driven shaft 15 fitted to the slot 11a of the orifice adjuster 11.

The reference numerals 16 and 17 denote upper and lower thrust washers made of a material with a small friction coefficient, for instance, plastics material. When the piston assembly 1 moves downward, since upward fluid pressure is applied to the orifice adjuster 11, the upper thrust washer 16 disposed between the sealing member 10 and the orifice adjuster 11 functions as a thrust bearing; on the other hand, when the piston assembly 1 moves upward, since downward fluid pressure is applied to the orifice adjuster 11, the lower thrust washer 17 disposed between the orifice adjuster 11 and the top end of the tubular member 12 functions as a thrust bearing.

The reference numeral 18 denotes a conical spring to urge the orifice adjuster 11 upward against the sealing member 10 when pressure within the cylinder is balanced.

The orifice adjuster 11 is formed with a lower central bore 11b, a side horizontal orifice 11c and a top vertical passage 11d. The tubular member 12 is formed with a central bore 12e. Therefore, the fluid pressure within the cylinder 2 is directly applied to the thrust washer 16 or 17 and the sealing member 10 by way of the central bore 12e of the tubular member 12, the central bore 11b of the orifice adjuster 11, the side horizontal orifice 11c, the space formed between the orifice adjuster 11 and the tubular member 12 for disposing the conical spring 18, and the top vertical passage 11d. Accordingly, the sealing member 10 functions to prevent fluid leakage toward the position sensor side.

Further, the reference numeral 19 denotes a stopper for restricting the upward movement of the piston rod 3 within the cylinder 2, which is brought into contact with a packing (not shown) disposed at the uppermost position of the cylinder 2.

Figure 2:
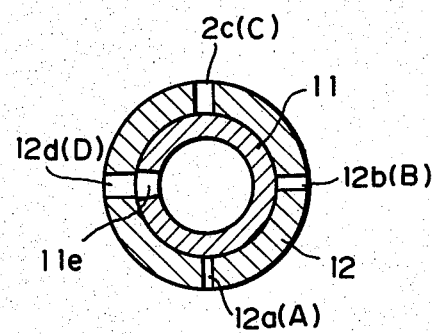
FIG. 2 is a fragmentary cross-sectional view taken along the line A—A shown in FIG. 1, in which there are illustrated one cutout formed in the orifice adjuster and four orifices formed in the tubular member.

To adjust the damping force of the shock absorber, four orifices 12a, 12b, 12c and 12d are formed radially or horizontally in the tubular member 12. The diameter of the first orifice 12a is the smallest; that of the second orifice 12b is medium; that of the third orifice 12c is also medium but greater than that of the second orifice 12b; that of the fourth orifice 12d is the largest, as depicted in FIG. 2, being arranged counterclockwise at circumferentially spaced equal angular intervals (90 degrees). Further, a cutout 11e is formed at the lower end of the orifice adjuster 11, also as depicted in FIG. 2.

The cutout 11e of the orifice adjuster 11 and the four orifices 12a to 12d of the tubular member 12 are so mutually arranged that when the orifice adjuster 11 is rotated by the driven shaft 15 and then stops at one of four predetermined angular positions, the cutout 11e can communicate with any one of four orifices 12a to 12d. As a result, a part of the working fluid is by-passed by way of the central bore 12e, the cutout 11e, and one of four orifices from the upper chamber to the lower chamber or vice versa. In this case, in the case where the cutout 11e communicates with the first orifice 12a (the smallest dia.), the greatest damping force will be obtained; where the cutout 11e communicates with the second or third orifice 12b or 12c (the medium dia.), the medium damping force will be obtained; where the cutout 11e communicates with the fourth orifice 12d (the largest dia.), the smallest damping force will be obtained.

Further in FIG. 1, the reference numeral 21 denotes a harness to connect the motor 7 and the orifice adjuster position sensor 9 to a control unit 100 shown in FIG. 5, which is guided through a central cylindrical hollow cavity formed in the piston rod 3.

In FIG. 1, it should be noted that there is provided a clearance C between the bottom flat end of the driven shaft 15 of the reduction gear 8 and the bottom surface of the slot 11a formed on top of the orifice adjuster 11. The reason why such a clearance is provided is as follows: Although the orifice adjuster 11 is always urged upward by the fluid pressure within the upper chamber 5 and the elastic force of the conical spring 18, since there exists a clearance therebetween, it is possible to prevent the orifice adjuster 11 from being directly brought into pressure-contact with the driven shaft 15 of the reduction gear 8, thus it being possible to reduce the torque required for the motor 7, that is, the size of the motor, while improving the lifetime of the motor. The thrust of the orifice adjuster 11 is received by the upper thrust washer 16 disposed between the sealing member 10 and the orifice adjuster 11, being made of a material with a small friction coefficient.

Figure 3:
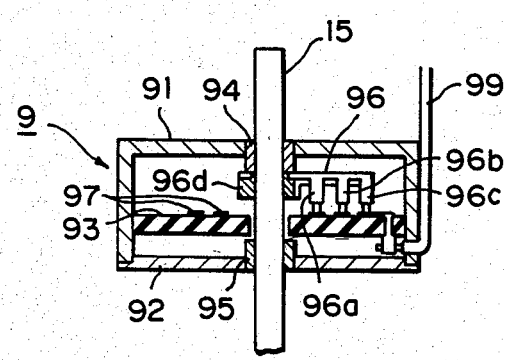
FIG. 3 a cross-sectional view of an orifice adjuster position sensor used with the variable-damping-force shock absorber according to the present invention.

FIG. 3 shows the construction of the orifice adjuster position sensor 9. In the figure, the reference numeral 15 denotes the driven shaft of the reduction gear 8; the numeral 91 denotes a sensor housing; the numeral 92 denotes a sensor bottom plate; the numeral 93 denotes an insulating board fixed to the sensor housing 91; the numeral 94 denotes an upper bearing fixed to the sensor housing 91; the numeral 95 denotes a lower bearing fixed to the sensor bottom plate 92. The reference numeral 96 denotes an arm including a first brush 96a, a second brush 96b and a third brush 96c, which is fixed to the driven shaft 15 by a cylindrical member 96d so as to be rotated by the motor together with the orifice adjuster 11. Being made of a conductive material plate, these three brushes 96a, 96b and 96c are electrically connected to each other. The reference numeral 97 denotes a plurality of conductive pattern leads formed on the insulating board 93, at least one of which is always in contact with one of the three brushes 96a, 96b and 96c while the orifice adjuster 11 is being rotated by the motor, that is, while the brushes slide on the conductive pattern leads 97.

Figures 4A, 4B:
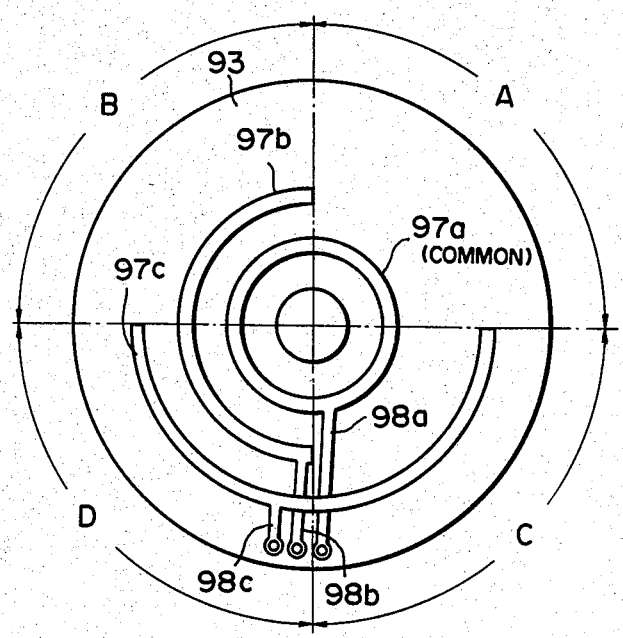
FIG. 4(A) is an enlarged plan view of a plurality of conductive pattern leads used for the orifice adjuster position sensor shown in FIG. 3.
FIG. 4(B) is a table showing the relationship between four manual selector positions of H, M, L and MIN, four orifices 12a to 12d formed in the tubular member, binary code signals generated from two conductive pattern leads c and b provided for the orifice adjuster position sensor, four reference signals $E_1$ to $E_4$, and four quadrantal ranges of the orifice adjuster position sensor.

FIG. 4a is an enlarged top view of these three conductive pattern leads 97a, 97b, and 97c. The reference numeral 97a is a first circular conductive pattern lead of a smallest diameter including a first straight lead 98a, which is arranged as to be in contact with the first brush 96a; the reference numeral 97b is a second semicircular conductive pattern lead of a medium diameter including a second straight lead 98b, which is so arranged as to be in contact with the second brush 96b; the reference numeral 97c is a third semicircular conductive pattern lead of a largest diameter including a third straight lead 98c, which is so arranged as to be in contact with the third brush 96c. The second and third semicircular conductive pattern leads 97b and 97c are disposed being shifted by 90 degrees in such a way that the second lead 97b is formed covering the angular ranges B and D and the third one 97c is formed covering the angular ranges D and C. Further, these three leads 98a, 98b and 98c are so formed as to be electrically insulated from each other with a thin insulating film disposed under the third conductive pattern lead 97c or on the first and second leads 98a and 98b.

As depicted in FIG. 5, the first lead 98a is connected to the ground; the second and third leads 98b and 98c are connected to a power supply via appropriate resistors $R_1$ and $R_2$.

Therefore, when the brush 98 is located within the quadrantal range A in FIG. 4a, although the first brush 96a is in contact with the first circular conductive pattern lead 97a, since the second and third brushes 96b and 96c are not in contact with the second and third semicircular conductive pattern lead 97b and 97c, these two pattern leads 97b and 97c are at a logical "1" voltage level. When the brush 96 is located within the quadrantal range B, since the second brush 96b is in contact with the second semicircular conductive pattern lead 97b but the third brush 96c is not in contact with the third semicircular conductive pattern lead 97c, the second lead 97b is grounded, that is, at a logical "0" voltage level and only the third lead 97c is at a logical "1" voltage level. When the brush 96 is located within the quadrantal range C, since the second brush 96b is not in contact with the second semicircular conductive pattern lead 97b but the third brush 96c is in contact with the third semicircular conductive pattern lead 97c, the second lead 97b is at a logical "1" voltage level and the third plate 97c is grounded, that is, at a logical "0" voltage level. When the brush 96 is located within the quadrantal range D, since the second and third brushes 96b and 96c are both in contact with the second and third semicircular conductive pattern leads 97b and 97c, both the second and third leads 97b and 97c are grounded, that is, at a logical "0" voltage level. The binary code signals thus generated from the position sensor 9 are listed in FIG. 4(B), being classified into the four quadrantal ranges A to D.

Further, the reference numeral 99 denotes a harness including wires connected between these three leads 98a, 98b and 98c to the control unit 100 shown in FIG. 5.

In summary, this position sensor 9 can be considered as a kind of encoder which can output binary code signals corresponding to the positions of the driven shaft 15 or the orifice adjuster 11. Although the position sensor 9 has been described in which three brushes are provided to detect four positions (90 degrees) of the driven shaft 15, it is of course possible to provide four or more brushes to detect the shaft angular positions more accurately.

FIG. 5 shows a block diagram of the control unit 100 used with the variable-damping-force shock absorber according to the present invention.

In the figure, the reference numeral 101 denotes a speed sensor for outputting signals corresponding to the vehicle speed. The reference numeral 102 denotes a manual selector for selecting the rate of the damping force of the shock absorber according to the driver's preference. When set to the L position, the lowest damping force can be obtained; when set to M position, the medium damping force can be obtained; when set to the H position, the highest damping force can be obtained. The reference numeral 103 denotes a reference signal generator for outputting a reference signal having a plurality of reference signal lever corresponding to the signals from the speed sensor 101 or the manual selector 102. The reference numeral 104 denotes a feedback decoder for outputting a position signal having a plurality of position signals in response to the binary code signal outputted from the orifice adjuster position sensor 9. The reference numeral 105 denotes a comparator for comparing the reference signal from the reference signal generator 103 with the position signal from the feedback decoder 104 and outputting a motor driving signal when the signals do not match but no signal when the signals match. The reference numeral 106 denotes a motor driver for outputting a power signal to drive the motor 7 in a predetermined direction.

Now, follows a description of operation of the variable-damping-force shock absorber according to the present invention.

When the driver sets the manual selector 102 to, for instance, the medium position M, the manual selector 102 outputs to the reference signal generator 103 a signal $S_2$ for selecting the medium damping force, so that the generator 103 outputs a reference signal whose voltage level is $E_{20}$ to the comparator 105. In this case, if the feedback decoder 104 is outputting a signal whose voltage level is different from that of $E_{20}$ corresponding to the signal $S_2$, the comparator 105 outputs a motor driving signal to the motor 7 via the motor driver 106. Therefore, the motor 7 rotates in the predetermined direction. When the motor 7 rotates and therefore the brush 96 comes within the guadrantal range B, since the second conductive pattern lead 97b is grounded and the third conductive pattern lead 97c is opened, two logical signals (b=0, c=1) are inputted to the feedback decoder 104. In response to these binary signals, the decoder 104 outputs a signal whose voltage level is $E_2$ to the comparator 105. Since the input signal levels $E_{20}$ and $E_2$ match, the comparator 105 stops outputting a motor driving signal to the motor 7, so that the brush 96 stops within the guadrantal range B. In this case, since the adjuster 11 is so arranged that the cutout 11e communicates with the second orifice 12b (medium diameter) of the tubular member 12, the working fluid is by-passed through the second orifice 12b and the cutout 11e. Therefore, the damping force is diminished from the damping force obtained by the conventional damping-force generating means including the upper and lower piston valves 1-1 and 1-2, it is possible to obtain the medium damping force. The upper piston valve allows the fluid to flow from the lower chamber 6 to the upper chamber 5 when the piston 1 moves downward in compression mode; the lower piston valve allows the fluid to flow from the upper chamber 5 to the lower chamber 6 when the piston 1 moves upward in extension mode.

When the driver sets the manual selector 102 from the medium position M to the high position H, the selector 102 outputs a signal $S_1$ for selecting the high damping force to the reference signal generator 103, so that the generator 103 outputs a reference signal whole voltage level is $E_{10}$ to the comparator 105. In this case, since the feedback decoder 104 is outputting a signal whose voltage level is $E_2$ corresponding to the second signal $S_2$, the comparator 105 outputs a motor driving signal to the motor 7 via the motor driver 106. Therefore, the motor 7 rotates in the predetermined direction. When the motor 7 rotates and therefore the brush 96 comes within the quadrantal range A, since the second and third conductive pattern leads 97b and 97c are both opened, two logical signals (b=1, c=1) are inputted to the feedback decoder 104. In response to these binary signals, the decoder 104 outputs a signal whose voltage level is $E_1$ to the comparator 105. Since the input signal levels $E_{10}$ and $E_1$ match, the comparator 105 stops outputting a motor driving signal to the motor 7, so that the brush stops within the quadrantal range A. In this case, since the adjuster 11 is so arranged that the cutout 11e communicates with the first orifice 12a (small diameter) of the tubular member 12, a part of the working fluid is by-passed through the first orifice 12a and the cutout 11e. Since the damping force is only slightly diminished from the damping force obtained by the conventional damping-force generating means, it is possible to obtain the highest damping force.

In the same way, when the manual selector 102 is set to the low position L, the selector 102 outputs a signal $S_3$ for selecting the low damping force to the reference signal generator 103. When the motor 7 rotates and the brush 96 comes within the quadrantal range D, two logical signals (b=1, c=1) are inputted to the feedback decoder 104 and a signal whose voltage level is $E_3$ is inputted from feedback decoder 104 to the comparator 105. When the motor 7 stops, since the adjuster 11 is so arranged that the cutout 11e communicates with the third orifice 12c (large diameter) of the tubular member 12, it is possible to obtain the lower damping force.

In addition to the above-mentioned manual damping force selector 102, there is provided the speed sensor 101 in this embodiment. The speed sensor 101 serves to automatically shift the damping forces selected by the manual selector 102 accoding to vehicle speed.

When vehicle speed exceeds, for instance, 80 km/h, the speed sensor 101 outputs a positive speed signal indicative of high speed. In response to this speed signal, the second reference voltage level $E_2$ (medium damping force) is shifted to the first reference voltage level $E_1$ (high damping force) or the third reference voltage level $E_3$ (low damping force) is shifted to the second reference voltage level $E_2$ (medium damping force), automatically, in the reference signal generator 103.

On the other hand, when the vehicle speed drops below, for instance, 30 km/h, the speed sensor 101 outputs a negative speed signal indicative of the low speed. In response to this speed signal, the first reference voltage level $E_1$ (high damping force) is shifted to the second reference voltage level signal $E_2$ (medium damping force) or the second reference level $E_2$ (medium damping force) is shifted to the third reference voltage level $E_3$ (low damping force) or the third reference level $E_3$ (low damping force) is shifted to the fourth reference voltage level $E_4$ (the lowest damping force), automatically, in the reference signal generator 103.

If the speed sensor 101 outputs a negative speed signal to the reference signal generator 103 when the manual selector 102 is set at the low position L, the generator 103 outputs a reference signal whose voltage level is $E_4$ to the comparator 105. In this case, since the feedback decoder 104 is outputting a signal whose voltage level is $E_3$ corresponding to the third signal $S_3$, the comparator 105 outputs a motor driving signal to the motor 7 via the motor driver 106. Therefore, the motor 7 rotates in the predetermined direction. When the motor 7 rotates and therefore the brush 96 comes within the quadrantal range D, since the second and third conductive pattern leads 97b and 97c are both grounded, two logical signals (b=0, c=0) are inputted to the feedback decoder 104. In response to these binary signals, the decoder 104 outputs a signal whose voltage level is $E_4$ to the comparator 105. Since the input signal levels $E_{40}$ and $E_4$ match, the comparator 105 stops outputting a motor driving signal to the motor 7, so that the brush stops within the quadrantal range D. In this case, since the adjuster 11 is so arranged that the cutout 11e communicates with the fourth orifice 12d (maximum diameter) of the tubular member 12, a part of the working fluid is by-passed through the fourth orifice 12d and the cutout 11e. Therefore, the damping force is plentifully diminished from the damping force obtained by the conventional damping-force generating means, it is possible to obtain the minimum damping force.

The above-mentioned complicated relationships between damping force rates (H, M, L, MIN), orifices (12a, 12b, 12c, 12d), binary code signals (b, c), reference signal levels ($E_1$, $E_2$, $E_3$, $E_4$) and quadrantal ranges (A, B, C, D) are listed in FIG. 4(B) for assistance in understanding of these mutual relationships.

Description has been made of the case where the comparator 105 compares the voltage levels $E_1$, $E_2$, $E_3$ and $E_4$ of the signals outputted from the feedback decoder 104 with the reference voltage levels $E_{10}$, $E_{20}$, $E_{30}$ and $E_{40}$ of the signals outputted from the reference signal generator 103 in analog fashion. However, it is of course possible to compare digital signals outputted from the feedback decoder 104 with digital reference signals outputted from the reference signal generator 103 in a digital fashion.

Further, description has been made of the case where the speed sensor 101 outputs two positive and negative vehicle speed signals when vehicle speed exceeds 80 km/h and drops below 30 km/h. However, it is of course possible to output a plurality of positive or negative vehicle speed signals to shift the damping force whenever vehicle speed exceeds or drops below two or more different preset speeds. Further, it is also possible to output a single positive or negative vehicle speed signal to shift the damping force only when vehicle speed exceeds or drops below a predetermined vehicle speed.

Figure 6:
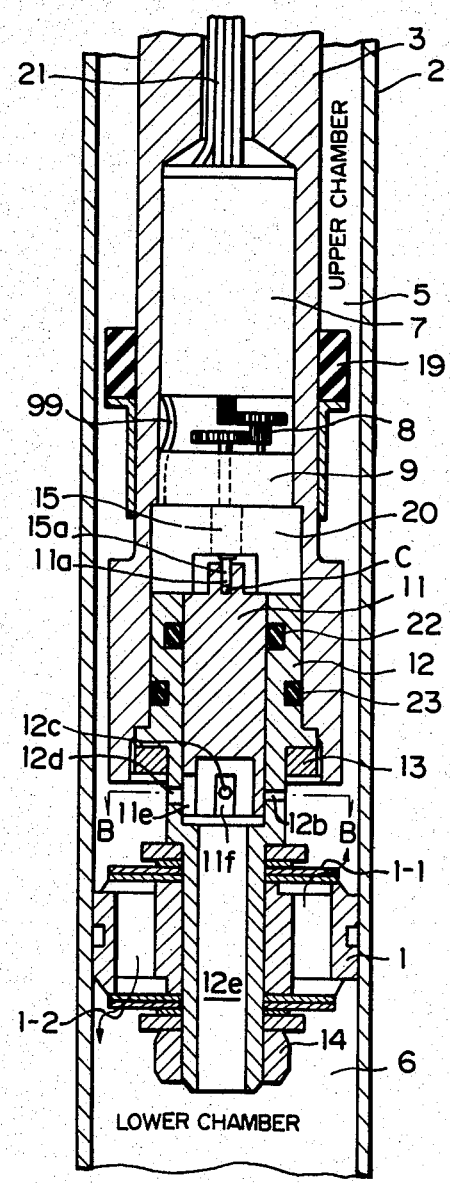
FIG. 6 is a cross-sectional view, partly side view, of the essential portion of a second embodiment of the variable-damping-force shock absorber according to the present invention.

FIG. 6 shows a second embodiment of the variable-damping-force shock absorber according to the present invention.

In addition to the basic elements, the shock absorber roughly comprises a motor 7 housed inside the piston rod 3, a reduction gear 8 made up of a train of gear wheels for reduction of revolution speed of the motor 7, an orifice adjuster position sensor 9 the same as already described with reference to FIGS. 3, 4, and 5, a shaft bearing 20, an orifice adjuster 11 rotatably connected to a driven shaft of the reduction gear 8 and provided with a cutout, and a tubular member 12 provided with a plurality of orifices of different diameters to which the piston assembly 1 is fixed.

To assemble the central portion of the shock absorber, these elements are fitted to the central hollow cavity of the piston rod 3 in the order of the motor 7, the reduction gear 8, the position sensor 9, the shaft bearing 20, the orifice adjuster 11, and the tubular member 12, and then these elements are fixed together to the piston rod 3 by screwing a flat screw 13 into the thread formed on the inner circumferential portion of the piston rod 3. Further, the piston assembly 1 is fixed to the tubular member 12 by a nut 14.

Additionally, in FIG. 6, the reference numeral 15 denotes a driven shaft of the reduction gear 8, the end of which is formed into a roughly square shape 15a by, for instance, a milling machine and is engaged with a slot 11a formed on top of the orifice adjuster 11 with a clearance C provided therebetween in tha axial direction thereof, in order to prevent the upward pressure of the orifice adjuster 11 from being applied directly to the driven shaft 15. Therefore, when the driven shaft rotates, torque is freely transmitted from the reduction gear 8 to the orifice adjuster 11 through the driven shaft 15 fitted to the slot 11a of the orifice adjuster 11.

In place of the upper and lower thrust washers 16 and 17 (shown in FIG. 1), in this second embodiment, there are provided two O-rings 22 and 23. The O-ring 22 is used for sealing between the orifice adjuster 11 and the tubular member 12; the O-ring 23 is used for sealing between the tubular member 12 and the piston rod 3, both in order to prevent fluid leakage.

In the same way as in the first embodiment, to adjust the damping force of the shock absorber, four orifices 12a, 12b, 12c and 12d are formed radially or horizontally in the tubular member 12. The diameter of the first orifice 12a is the smallest; that of the second orifice 12b is medium; that of the third orifice 12c is medium but greater than that of the second orifice 12b; that of the fourth orifice 12d is the largest, as depicted in FIG. 7, being arranged counterclockwise at circumferentially spaced equal angular intervals (90 degrees).

Figure 7:
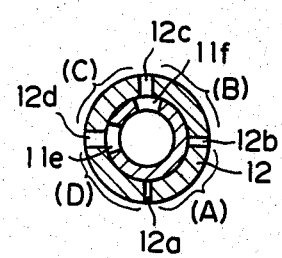
FIG. 7 is a fragmentary cross-sectional view taken along the line B—B shown in FIG. 6, in which there are illustrated two cutouts formed in the orifice adjuster and four orifices formed in the tubular member.

Being different from the first embodiment, in this second embodiment, two cutouts 11e and 11f are formed with an angular interval of 90 degrees on the lower end of the orifice adjuster 11, also as depicted in FIG. 7.

The two cutouts 11e and 11f of the orifice adjuster 11 and the four orifices 12a to 12d of the tubular member 12 are so mutually arranged that when the orifice adjuster 11 is rotated by the driven shaft 15 and stops at one of four positions, the two cutouts 11e and 11f can communicate with any two of four orifices 12a to 12d. As a result, the working fluid is by-passed by way of the central bore 12e, the two cutouts 11e and 11f, and two of four orifices from the upper chamber to the lower chamber or vice versa.

In this case, when the two cutouts 11e and 11f communicate with the first orifice 12a (the smallest) and the second orifice 12b (first medium), the greatest damping force will be obtained; when the two cutouts communicate with the second orifice 12b (first medium) and the third orifice 12c (second medium), the medium damping force will be obtained; when the two cutouts communicate with the third orifice 12c (second medium) and the fourth orifice 12d (the largest), the smallest damping force will be obtained; when the two cutouts communicate with the fourth orifice 12d (the largest) and the first orifice 12a (the smallest), a damping force greater than that obtained when the two cutouts communicate with the third orifice 12c and the fourth orifice 12d will be obtained.

In this embodiment, if the sum of the areas of the second and third orifices 12b and 12c is equal to the sum of the areas of the fourth and first orifices 12d and 12a, it is possible to obtain a cycle of the largest damping force (12a, 12b), the medium damping force (12b, 12c), the lowest damping force (12c, 12d), the medium damping force (12d, 12a) or (12b, 12c), the largest damping force (12a, 12b)—, continually, when the orifice adjuster 11 rotates counterclockwise.

The second embodiment of the variable-damping-force shock absorber according to the present invention can be operated by the same control unit 100 shown in FIG. 5, in the same way as already described in the first embodiment.

FIG. 8 shows a third embodiment according to the present invention.

In this embodiment, a step motor 7A is used in place of the ordinary motor 7 described in the first and second embodiments.

The step motor 7A comprises three or more armatures around which three or moe coils are wound. Therefore, when these three coils are energized sequentially by three sequential input pulses, it is possible to rotate the step motor by one step (a predetermined step angle; e.g. 20 degrees). By applying a series of these three sequential pulses, the pulse motor can be rotated to a predetermined angular position corresponding to the number of sets of these three sequential input pulses.

In FIG. 8, the reference numeral 110 denotes an angle presetting device for outputting a command signal to rotate the pulse motor 7A to a predetermined angle (e.g. 90 degrees); the reference numeral 111 denotes a pulse generator for outputting a series of three sequential input pulses in response to the command signal from the angle presetting device to rotate the orifice adjuster.

Therefore, when the driver sets the angle presetting device 110, for instance, to the M position, the angle presetting device 110 outputs a command signal indicative of M position. In response to this command signal M, the pulse generator 111 outputs a predetermined number of three sequential input pulse signals to the step motor 7A and thereafter keeps outputting a high-voltage level signal to hold the step motor at its position. Therefore, the pulse motor 7A can be rotated to a position where the cutout 11e of the orifice adjuster 11 communicates with the second orifice 12b (in FIG. 2) and then keeps the orifice adjuster 11 at its position. As a result, it is possible to obtain the medium damping force.

Thereafter, when the driver sets the angle presetting device 110, for instance, from the M position to the L position, the angle presetting device 110 outputs a command signal indicative of M position after releasing the step motor 7A to the original position. In response to this command signal L, the pulse generator 111 outputs another predetermined number of three sequential pulse signals to the step motor 7A and thereafter keeps outputting a high-voltage level signal. Therefore, the pulse motor 7A is rotated to a position where the cutout 11e of the orifice adjuster 11 communicates with the third orifice 12c (in FIG. 2) and then keeps the orifice adjuster 11 at its position, irrespective of the preceding orifice adjuster positions. As a result, it is possible to obtain the low damping force.

In the case where the step motor is used with the shock absorber according to the present invention, it is possible to omit the reduction gear and the position sensor, because the step motor does not rotate continuously at a high speed and further is directly controlled instead of feedback controlled.

Further, in FIG. 8 the reference numeral 15 denotes a driven shaft of the step motor 7A, the end of which is formed into a roughly square shape by, for instance, a milling machine and is engaged with a slot 11a formed on top of the orifice adjuster 11 with a clearance C provided therebetween in the axial direction thereof. Therefore, it is possible to prevent the upward pressure of the orifice adjuster 11 from being directly applied to the driven shaft 15a of the step motor 7.

As described above, in the variable-damping-force shock absorber for an automotive vehicle according to the present invention, since the motor for selecting orifices is housed within the piston rod or the cylinder of the shock absorber, it is possible to reduce noise produced from the motor and to protect the motor from mud or rain water, thus improving the lifetime of the motor.

Further, since there is provided a digital position sensor for detecting the positions of the orifice adjuster, it is possible to feedback control the orifice adjuster of the shock absorber in digital fashion, thus improving the accuracy and response speed.

Furthermore, since there is provided a clearance between the driven shaft of the reduction gear or the step motor and the adjuster in the axial direction thereof, it is possible to prevent fluid pressure within the fluid chamber from being directly applied to the driven shaft of the reduction gear or the step motor, thus reducing the torque or the size of the motor and further improving the lifetime of the motor.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A variable-damping-force shock absorber, which comprises:
    (a) a cylinder (2) filled with a working fluid;
    (b) a piston rod (3) sealably and reciprocably inserted into said cylinder at one end of said cylinder;
    (c) a piston assembly (1) slidably fitted to said cylinder so as to divide the housing of said cylinder into an upper chamber and a lower chamber, said piston assembly being provided with damping-force generating means for restrictively allowing the working fluid to flow between upper and lower chambers divided by said piston assembly when said piston assembly moves to and fro within said cylinder;
    (d) a tubular member (12), the lower end of which communicates with the lower chamber, for connecting said piston rod and said piston assembly, said tubular member being provided with a plurality of orifices of different diameters radially formed in the wall thereof at circumferentially spaced equal angular intervals to communicate with the upper chamber;
    (e) an orifice adjuster (11) rotatably fitted to said tubular member, said adjuster being provided with an axial bore to communicate with the lower chamber and at least one cutout formed in the wall of the axial bore thereof to selectively communicate with at least one of the orifices formed in said tubular member;
    (f) a motor (7) housed within a bored cavity of said piston rod and connected to said orifice adjuster for rotating said orifice adjuster;
    (g) means for sensing the angular position of said orifice adjuster in digital fashion, said means being rotated by said motor together with said orifice adjuster; and
    (h) means for feedback controlling the revolution angle of said orifice adjuster for communication of the cutout formed in said orifice adjuster with at least one of the orifices formed in said tubular member, said control means being connected to said motor and said orifice adjuster angular position sensing means,
    whereby part of the working fluid displaceably passed between the two fluid chambers is adjustably by-passed through the cutout of said orifice adjuster and the orifice of said tubular member in order to vary the damping force of the shock absorber, when said orifice adjuster is controlled by means of said motor housed within said piston rod and said feedback control means in digital fashion.

2. A variable-damping-force shock absorber as set forth in claim 1, wherein said means for sensing the angular position of said orifice adjuster comprises:
    (a) a plurality of brushes (96) fixed to a driven shaft of said motor and rotated by said motor together with said orifice adjuster, said brushes being electrically connected to each other;
    (b) a fixed circular conductive pattern lead (97a) connected to the ground and disposed so as to be always in contact with one of said brushes while said orifice adjuster is rotating; and
    (c) a plurality of fixed semicircular conductive pattern leads (97b, 97c) connected to a supply voltage and disposed, being shifted by a predetermined angular range, so as to be in contact with one of said brushes independently while said orifice adjuster is rotating, each of said semicircular conductive pattern leads generating a logical "0" signal wherever each of said semicircular conductive pattern lead is in contact with said brushes and a logical "1" signal wherever each of said semicircular conductive pattern plates is not in contact with said brushes,
    whereby a plurality of binary coded signals can be generated in response to the angular positions of said orifice adjuster.

3. A variable-damping-force shock absorber as set forth in claim 1, wherein said means for feedback controlling the revolution angle of said orifice adjuster for communication of the cutout of said orifice adjuster with the orifice of said tubular member comprises:
    (a) a manual selector (102) for outputting a plurality of damping-force rate signals H, M, L;
    (b) a reference signal generator (103) connected to said manual selector for outputting a plurality of reference signals in response to the damping-force rate signals;
    (c) a feedback decoder (104) connected to said orifice adjuster angular position sensing means for decoding the coded orifice adjuster position signals from said position sensing means and outputting signals corresponding thereto; and
    (d) a comparator (105) connected to said reference signal generator and said feedback decoder for comparing the reference signal from said reference signal generator with the decoded orifice adjuster position signal from said feedback decoder and outputting a motor driving signal only when both the signals do not match in order to further rotate the orifice adjuster and no motor driving signal when both the signals match in order to stop the orifice adjuster.

4. A variable-damping-force shock absorber as set forth in claim 3, which further comprises a vehicle speed sensor (101) connected to said reference signal generator for outputting a signal to shift by one step the reference signals already determined in response to a damping-force rate signal from said manual selector, when vehicle speed exceeds or drops below a predetermined vehicle speed.

5. A variable-damping-force shock absorber, which comprises:
    (a) a cylinder (2) filled with a viscous working fluid;
    (b) a piston rod (3) sealably and reciprocably inserted into said cylinder at one end of said cylinder;
    (c) a piston assembly (1) slidably fitted to said cylinder so as to divide the housing of said cylinder into an upper chamber and a lower chamber, said piston assembly being provided with damping-force generating means for restrictively allowing the working fluid to flow between the upper and lower chambers provided by said piston assembly when said piston assembly moves to and fro within said cylinder;
    (d) a tubular member (12), the lower end of which communicates with the lower chamber, for connecting said piston rod and said piston assembly, said tubular member being provided with a plurality of orifices of different diameters radially formed in the wall thereof at circumferentially spaced equal angular intervals to communicate with the upper chamber;

(e) an orifice adjuster (11) rotatably fitted to said tubular member, said adjuster being provided with an axial bore to communicate with the lower chamber and at least one cutout formed in the wall of the axial bore thereof to selectively communicate with at least one of the orifices formed in said tubular member;

(f) a step motor (7) housed within a bored cavity of said piston rod and connected to said orifice adjuster for rotating said orifice adjuster;

(g) means for directly controlling the revolution angle of said step motor for communication of the cutout formed in said orifice adjuster with at least one of said orifices formed in said tubular member, said control means being connected to said step motor, whereby part of the working fluid displaceably passed between the two fluid chambers is adjustably by-passed through the cutout of said orifice adjuster and the orifice of said tubular member in order to vary the damping force of the shock absorber, when said orifice adjuster is directly controlled by means of said step motor housed within said piston rod and said control means, (h) wherein said orifice adjuster is formed with a slot, at one end thereof, into which a flat portion of a driven shaft of said motor is fitted and there is further provided a clearance between the slot and the driven shaft in the axial direction thereof, in order to prevent fluid pressure within the chamber from being directly applied to said motor via said orifice adjuster.

6. A variable-damping-force shock absorber as set forth in claim 5, wherein said means for controlling the revolution angle of said step motor comprises:

(a) an angle presetting device (110) for outputting a plurality of damping-force rate signals;

(b) a pulse generator (111) connected to said angle presetting device for outputting a series of pulse signals in response to the damping-force rate signals to rotate said step motor to an appropriate position where the cutout formed in said orifice adjuster opens to at least one of the orifices formed in said tubular member, through which the damping force preset by said angle presetting device can be obtained.

7. A variable-damping-force shock absorber as set forth in claim 1, wherein said orifice adjuster is formed with a slot, at one end thereof, into which a flat portion of a driven shaft of said motor is fitted and there is further provided a clearance between the slot and the driven shaft in the axial direction thereof, in order to prevent fluid pressure within the chamber from being directly applied to said motor via said orifice adjuster.

8. A variable-damping-force shock absorber, which comprises:

(a) cylinder (2) filled with a viscous working fluid;

(b) a piston rod (3) sealably and reciprocably inserted into said cylinder at one end of said cylinder;

(c) a piston assembly (1) slidably fitted to said cylinder so as to divide the housing of said cylinder into an upper chamber and a lower chamber, said piston assembly being provided with damping-force generating means for restrictively allowing the working fluid to flow between the upper and lower chambers provided by said piston assembly when said piston assembly moves to and fro within said cylinder;

(d) a tubular member (12), the lower end of which communicates with the lower chamber, for connecting said piston rod and said piston assembly, said tubular member being provided with a plurality of orifices of different diameters radially formed in the wall thereof at circumferentially spaced equal angular intervals to communicate with the upper chamber;

(e) an orifice adjuster (11) rotatably fitted to said tubular member, said adjuster being provided with an axial bore to communicate with the lower chamber and at least one cutout formed in the wall of the axial bore thereof to selectively communicate with at least one of the orifices formed in said tubular member;

(f) a step motor (7) housed within a bored cavity of said piston rod and connected to said orifice adjuster for rotating said orifice adjuster;

(g) means for directly controlling the revolution angle of said step motor for communication of the cutout formed in said orifice adjuster with at least one of said orifices formed in said tubular member, said control means being connected to said step motor, whereby part of the working fluid displaceably passed between the two fluid chambers is adjustably by-passed through the cutout of said orifice adjuster and the orifice of said tubular member in order to vary the damping force of the shock absorber, when said orifice adjuster is directly controlled by means of said step motor housed within said piston rod and said control means, (h) said shock absorber further comprising coupling means for coupling said step motor to said orifice adjuster, said coupling means comprising shaft means driven by said step motor receiving means of said orifice adjuster for receiving said driven shaft means, and means for reducing torque loading on said step motor by said orifice adjuster.

9. A variable-damping-force shock absorber as set forth in claim 8, wherein said means for reducing comprises means for preventing pressure from being applied to said step motor via said orifice adjuster.

10. A variable-damping-force shock absorber as set forth in claim 9, wherein said means for preventing comprises an axial spacing arrangement of said driven shaft means from said receiving means for providing an axial clearance between said driven shaft means and said receiving means.

11. A variable-damping-force shock absorber as set forth in claim 5, wherein said step motor includes a rotatably driven shaft substantially coaxial with the piston rod.

* * * * *